(12) United States Patent
Sayyarrodsari et al.

(10) Patent No.: US 9,292,010 B2
(45) Date of Patent: Mar. 22, 2016

(54) ONLINE INTEGRATION OF MODEL-BASED OPTIMIZATION AND MODEL-LESS CONTROL

(71) Applicant: Rockwell Automation Technologies, Inc., Mayfield Heights, OH (US)

(72) Inventors: Bijan Sayyarrodsari, Austin, TX (US); Kadir Liano, Austin, TX (US); Alexander B. Smith, Round Rock, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 498 days.

(21) Appl. No.: 13/669,135

(22) Filed: Nov. 5, 2012

(65) Prior Publication Data

US 2014/0128998 A1 May 8, 2014

(51) Int. Cl.
*G05B 13/02* (2006.01)
*G05B 13/04* (2006.01)
*G05B 17/02* (2006.01)

(52) U.S. Cl.
CPC .............. *G05B 13/042* (2013.01); *G05B 17/02* (2013.01)

(58) Field of Classification Search
CPC .............................. G05B 17/02; G05B 13/042
USPC .................. 700/28, 29, 32, 33, 37, 42, 44, 45
See application file for complete search history.

(56) References Cited

U.S. PATENT DOCUMENTS

| | | | |
|---|---|---|---|
| 5,394,322 A * | 2/1995 | Hansen | 700/37 |
| 5,477,449 A | 12/1995 | Iino | |
| 7,706,899 B2 * | 4/2010 | El Rifai | 700/42 |
| 7,805,207 B2 * | 9/2010 | El Rifai | 700/42 |
| 8,019,701 B2 | 9/2011 | Sayyar-Rodsari et al. | |
| 8,032,235 B2 | 10/2011 | Sayyar-Rodsari et al. | |
| 2009/0222108 A1 * | 9/2009 | Lou et al. | 700/29 |

FOREIGN PATENT DOCUMENTS

WO          9312476 A1    6/1993

OTHER PUBLICATIONS

Yonghong Tan et al: "Auto-tuning PID control using neural predictor to compensate large time-delay", Control Applications, 1994, Proceedings of the Third IEEE Conference on Glasgow, UK Aug. 24-26, 1994, New York, NY, USA, IEEE, Aug. 24, 1994, pp. 1429-1434.
Miller R M et al: "Adaptive Predictive PID", Advances in Instrumentation and Control, Instrument Society of America, Research Triangle Park, US, vol. 50, n. Part 03, Oct. 1, 1995, pp. 883-892.

(Continued)

*Primary Examiner* — Charles Kasenge
(74) *Attorney, Agent, or Firm* — Fletcher Yoder, P.C.

(57) ABSTRACT

In certain embodiments, a control system includes a model-less controller configured to control operation of a plant or process. The control system also includes an automation controller operatively connected for access to a model of the plant or process being controlled by the model-less controller. The automation controller is configured to modify parameters of the model-less controller via an explicit optimization procedure.

16 Claims, 7 Drawing Sheets

(56) References Cited

OTHER PUBLICATIONS

Sanjay Parthasarathy et al: "Direct Adaptive Control Process Systems Using Recurrent Neural Networks", Proceedings of the American Control Conference (ACC). Chicago, Jun. 24-26, 1992; [Proceedings of the American Control Conference (ACC)], New York, IEEE, US, Jun. 24, 1992, pp. 63-65.

Extended European Search Report from European application No. 13191606.6 dated Feb. 25, 2014, 7 pgs.

L. Balbis, R. Katebi, and A. Ordys, "Model Predictive Control Design for Industrial Applications," ukacc.group.shef.ac.uk/proceedings/control2006/papers/f158.pdf, 2006.

M.G. NA, "Auto-tuned PID Controller Using a Model Predictive Control Method for the Steam Generator Water Level", IEEE Transaction on Nuclear Science, vol. 48, No. 5, Oct. 2001.

Q. Saeed, V. Uddin, and R. Katebi, "Multivariable Predictive PID Control for Quadruple Tank", World Academy of Science, Engineering and Technology 67, 2010.

M. Harmse, R. Hughes, R. Dittmar, H. Singh, and S. Gill, "Robust Optimization-based Multi-loop PID Controller Tuning: A New Tool and an Industrial Example", http://www.nt.ntnu.no/users/skoge/prost/proceedings/ adchem09/cd/abstract/90.pdf, Also in Control Engineering Practice, vol. 20, Issue 4, Apr. 2012, pp. 355-370.

M. Sadeghpour, V. Oliveira, and A. Karimi, "A toolbox for robust PID controller tuning using convex optimization," Laboratoire dAutomatique, EPFL, Lausanne, Switzerland, http://infoscience.epfl.ch/record/174923/files/PIDtoolbox.pdf.

* cited by examiner

ONLINE INTEGRATION OF MODEL-BASED OPTIMIZATION AND MODEL-LESS CONTROL

BACKGROUND

The present disclosure relates generally to control systems and, more particularly, control systems that include model-based controllers configured to modify parameters of model-less controllers.

Model-based optimization and control has received increasingly more attention both in academia and in industry over the past few decades. This is due at least in part to their success in the process industry. However, model-less strategies, such as proportional-integral-derivative (PID) controllers, are still very pervasive in industrial applications. Other model-less control strategies, such as expert systems, fuzzy logic controllers, and so forth, are also used in some industrial applications. One shortcoming of model-less control approaches is that the controller response does not account for the system's potential response in the future. As such, there is a need for augmenting the performance of model-less control strategies with predictive information using model-based optimization strategies.

BRIEF DESCRIPTION

In an embodiment, a control system includes a model-less controller configured to control operation of a plant or process. The control system also includes an automation controller operatively connected for access to a model of the plant or process being controlled by the model-less controller. The automation controller is configured to modify parameters of the model-less controller via an explicit optimization procedure.

In another embodiment, a non-transitory machine-readable memory medium includes program instructions that are executable by a processor. The program instructions include instructions for a model-based control module that includes a model of a plant or process being controlled by a model-less controller. The program instructions also include instructions for a parameter tuning module configured to modify parameters of the model-less controller based on outputs of the model-based control module.

In another embodiment, a non-transitory machine-readable memory medium includes program instructions that are executable by a multi-core processor. The program instructions include instructions for a model-less control module configured to control operation of a plant or process. The model-less control module is executed by a first processing core of the multi-core processor. The program instructions also include instructions for a model-based control module that includes a model of the plant or process being controlled by the model-less control module. The model-based control module is executed by a second processing core of the multi-core processor. In addition, the model-based control module includes a parameter tuning module configured to modify parameters of the model-less control module based on outputs of the model-based control module.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention are directed toward systems and methods for augmenting the performance of model-less control strategies, such as proportional-integral-derivative (PID) controllers, with predictive information using model-based optimization strategies. As described above, model-less control strategies, such as PID controllers, have become ubiquitous in industrial control applications. Such controllers have proven to be fairly robust yet relatively simple in operation. However, due at least in part to the relative simplicity of design, such controllers exhibit certain inherent shortcomings, such as an inability to account for potential future responses of the system being controlled.

In contrast, model-based optimization strategies, such as model predictive control (MPC) techniques, are particularly well-suited for incorporating predictive information of the system being controlled. However, model-based solutions are relatively complex as compared to model-less solutions and are generally more computationally intensive. The embodiments described herein incorporate the advantages of these two types of systems, while minimizing the respective drawbacks. In particular, the embodiments described herein include a model-based solution (e.g., an MPC controller) that modifies parameters of a model-less solution (e.g., a PID controller). There are currently no solutions available in the art where parameters of a model-less control system are treated as outputs of an MPC controller that is receiving measurements from the system being controlled, as accomplished by the embodiments described herein.

Although referred to herein as including PID controllers, other types of model-less controllers may be used instead of PID controllers. As used herein, the term "model-less controller" is intended to encompass industrial automation controllers that utilize control algorithms that do not explicitly use models (e.g., first principles models, and so forth) of the system being controlled in their search to determine control actions. Rather, again, such model-less controllers include PID controllers that, for example, utilize simple proportionalities, integrals, and derivatives between control variables to control the system. In other words, the "model-less controllers" described herein refer to controllers in which controller action at each execution interval is not the result of an explicit search strategy that explicitly uses a model of the system being controlled. Conversely, "model-based controllers" as described herein refer to controllers in which controller action at each execution interval is the result of an explicit search strategy that explicitly uses a model of the system being controlled.

Figure 1:
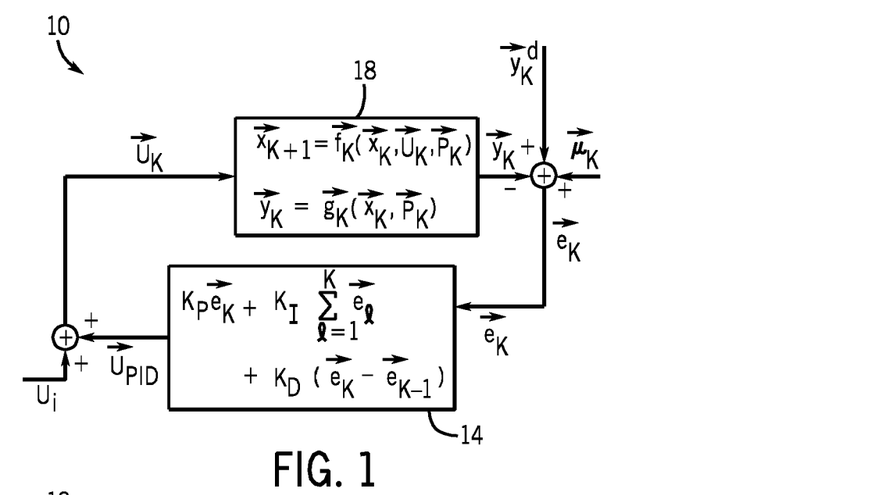
FIG. 1 is a schematic diagram of a control system that includes a position PID controller that may be augmented with an MPC controller.
Figure 2:
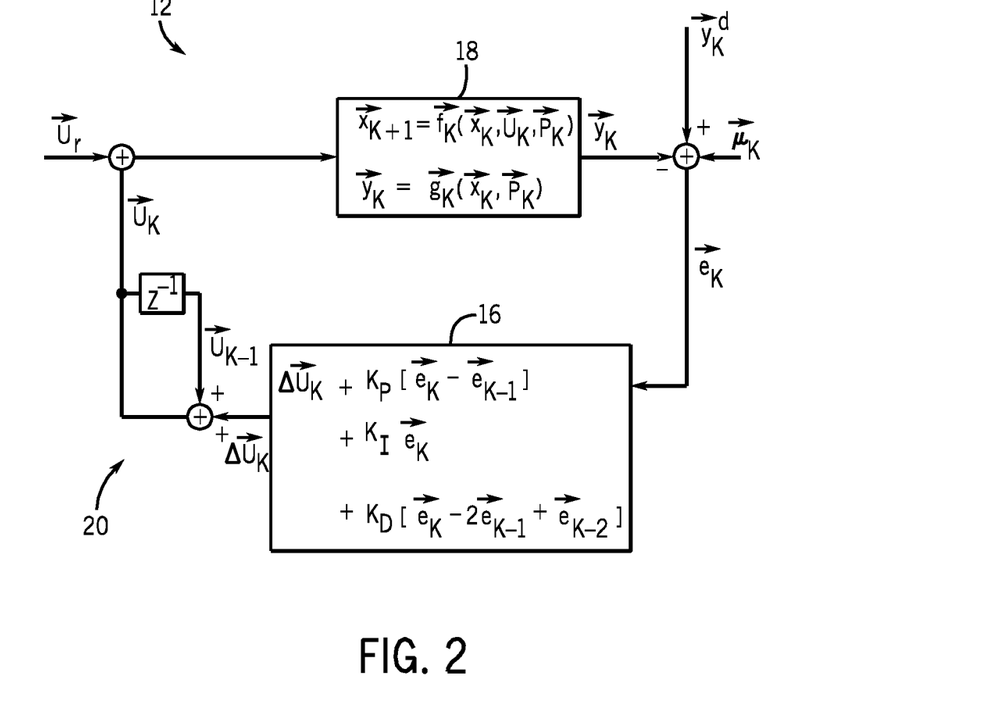
FIG. 2 is a schematic diagram of a control system that includes a velocity PID controller that may be augmented with an MPC controller.

FIGS. 1 and 2 are schematic diagrams of control systems 10, 12 that include PID controllers 14, 16, illustrating typical operation of such model-less controllers. In particular, FIG. 1 is a schematic diagram of a position PID controller 14, and FIG. 2 is a schematic diagram of a velocity PID controller 16, each of which may be augmented with MPC control techniques, as described in greater detail below. As illustrated in FIG. 1, an input vector $\vec{u}_k$ is received by a system 18 under control, where the system 18 being controlled is defined using the following equations (i.e. model):

$$\vec{x}_{k+1} = f_k(\vec{x}_k, \vec{u}_k, \vec{p}_k) \quad (1)$$

$$\vec{y}_k = g_k(\vec{x}_k, \vec{p}_k) \quad (2)$$

where $\vec{x}_k$ is the state vector, $\vec{p}_k$ is the parameter vector, and $\vec{y}_k$ is the output vector. The output error vector $\vec{e}_k$ between the output vector $\vec{y}_k$ of the system 18 and the determined output vector $\vec{y}_k^d$ (which may include measurements from the system being controlled; $\vec{\mu}_k$ being measurement noise) is received by the position PID controller 14, which adjusts $\vec{\mu}_{PID}$ according to:

$$K_P \vec{e}_k + K_I \sum_{l=1}^{k} \vec{e}_l + K_D(\vec{e}_k - \vec{e}_{k-1}) \quad (3)$$

where $K_P$, $K_I$, and $K_D$ are matrix coefficients relating to proportional, integral, and derivative constraints, respectively. The velocity PID controller 16 illustrated in FIG. 2 is similar to the position PID controller 14 illustrated in FIG. 1. However, the velocity PID controller 16 determines $\Delta \vec{u}_k$ as follows:

$$\Delta \vec{u}_k = K_P[\vec{e}_k - \vec{e}_{k-1}] + K_I \vec{e}_k + K_D[\vec{e}_k - 2\vec{e}_{k-1} + \vec{e}_{k-2}] \quad (4)$$

and a control loop 20 determines $\vec{u}_k$ based on $\Delta \vec{u}_k$ using previous values $\vec{u}_{k-1}$ as illustrated in FIG. 2, and $\vec{u}_k$ is compared to a reference $\vec{u}_r$ to determine the input to the system 18. In conventional systems, there has been no systematic methodology for tuning coefficients $K_P$, $K_I$, and $K_D$ of PID controllers, and certainly not during operation of the system being controlled. Unavoidable changes to the system dynamics often necessitate repeated tuning of PID loops, such as those illustrated in FIGS. 1 and 2, even in small dimensions. More specifically, proper tuning of the PID controllers 14, 16 beyond decoupled (or, at best, loosely coupled) single-input, single-output (SISO) loops has proven to be a challenge.

The PID controllers 14, 16 illustrated in FIGS. 1 and 2 are merely exemplary of the types of PID controllers 14, 16 that may be used. Any type of arrangement in which a function (linear, polynomial, nonlinear, and so forth) of output error $\vec{e}_k$, (filtered) derivative of the output error $\vec{e}_k$, and integral of the output error $\vec{e}_k$ is used to define a control input $\vec{u}_k$ will benefit from the techniques described herein. Any state for which the error signal can be computed may be represented as an output by proper augmentation of the output vector $\vec{y}_k$.

As described above, the embodiments described herein address the shortcomings of conventional PID controllers, by combining the best features of PID controllers (e.g., speed of operation) with the best features of MPC control techniques (e.g., robust predictive capabilities) for the purpose of increasing performance without introducing the drawbacks typically associated with either PID strategies (e.g., lack of predictive capabilities) or MPC strategies (e.g., complexity and relatively low level of responsiveness).

Figure 3:
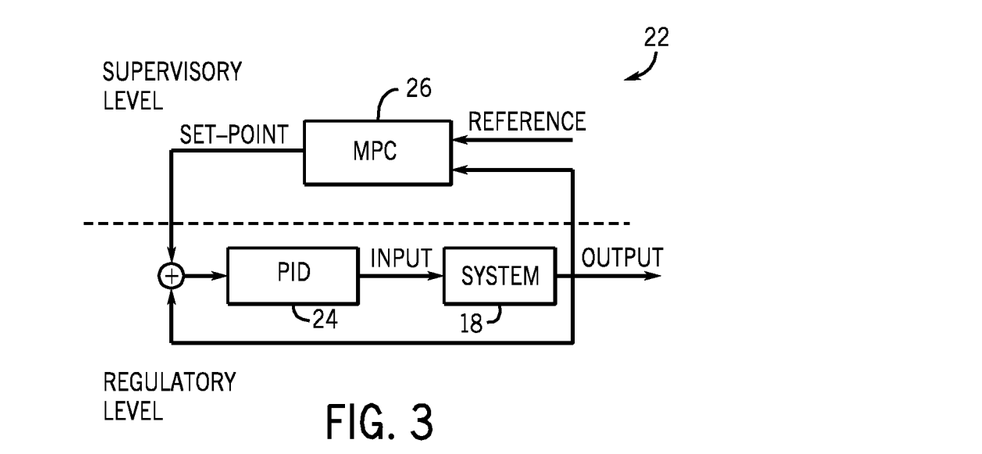
FIG. 3 is a schematic diagram of a control system in which an MPC controller is used in conjunction with a PID controller, such as the PID controllers illustrated in FIGS. 1 and 2.

For example, FIG. 3 is a schematic diagram of a control system 22 in which an MPC controller 26 is used in conjunction with a PID controller 24, such as the PID controllers 14, 16 illustrated in FIGS. 1 and 2. As illustrated, the MPC controller 26 may set a set-point based on a reference value, and the set-point may be compared to an output of the system 18 being controlled to generate an input to the PID controller 24. The PID controller 24, in turn, generates an input for control of the system 18. Furthermore, the output of the system 18 is used by the MPC controller 26 to generate the set-point.

Figure 4:
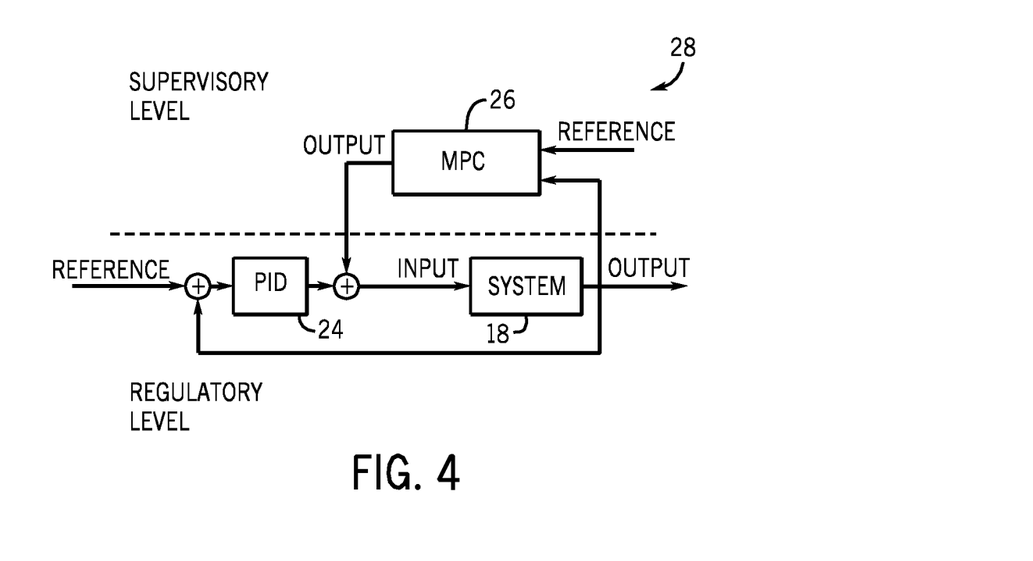
FIG. 4 is a schematic diagram of another control system in which an MPC controller is used in conjunction with a PID controller, such as the PID controllers illustrated in FIGS. 1 and 2.

FIG. 4 is a schematic diagram of another control system 28 in which an MPC controller 26 is used in conjunction with a PID controller 24, such as the PID controllers 14, 16 illustrated in FIGS. 1 and 2. The main difference between the control systems 22, 28 of FIGS. 3 and 4 is that, in FIG. 4, the output from the MPC controller 26 is added to an output of the PID controller 24 to generate the input for control of the system 18. As will be appreciated, both of the embodiments illustrated in FIGS. 3 and 4 include a supervisory level of control (e.g., the predictive characteristics of the MPC controller 26) and a regulatory level of control (e.g., the physical control of the system 18 that is accomplished by the PID controller 24). An advantage of the embodiments illustrated in FIGS. 3 and 4 is that the optimization algorithms performed by the MPC controller 26 operate on a higher level than the control algorithms performed by the PID controller 24, and do not interfere with the closed-loop nature of the PID controller 24.

However, the embodiments illustrated in FIGS. 3 and 4 themselves include certain shortcomings. For example, the quality of the PID controller 24 itself remains unchanged by the MPC controller 26. In other words, the MPC controller 26 does not fundamentally effect how the PID controller 24 operates. Rather, the MPC controller 26 merely indirectly affects inputs into and outputs from the PID controller 24, but does not modify the structure of the PID controller 24 itself.

Several techniques for enhancing the performance of the embodiments illustrated in FIGS. 3 and 4 may be used. As merely one contemplated example, an explicit solution for control may be derived by modeling the system 18 being controlled as a second-order linear system without constraints. The closed form solution that is derived could then be reformulated into two components, namely, a feedforward component and a feedback component. The feedback component could be further manipulated to resemble the structure of the PID controller 24. Although improving upon the control systems 22, 28 of FIGS. 3 and 4, such a solution would still have the drawbacks of not being applicable to non-linear systems, not applying to linear systems of order higher than two, not being applicable when process constraints are included, not applying to other implementations of PID controllers (e.g., a velocity implementation (see FIG. 2) versus a position implementation (see FIG. 1)), imposing a specific structure for the PID controller 24, and not explicitly attempting to optimize the structure of a pre-defined PID control structure.

As described in greater detail below, explicit optimization of parameters of the PID controller 24, taking into account operation constraints regardless of the specific process model, leads to more robust control. In particular, a model predictive view of the parameters of the PID controller 24 may be used. In other words, as opposed to seeking a constant value for the parameters of the PID controller 24, which would remain constant during the course of controller operation, predictive information relating to the parameters of the PID controller 24 may be considered. More specifically, the embodiments described above may be modified to switch from having fixed PID coefficients (e.g., $K_P$, $K_I$, and $K_D$) to a system that actually changes the parameters of the PID controller 24 at each execution cycle of control while taking into account a planned profile for the PID coefficients into the future. As described in greater detail below, the stability of this enhanced control system may be further improved using constraints on both PID parameter bounds and the rate of change in PID parameter values.

As described above, using model-based control (MBC) techniques (such as MPC controllers) to complement the capabilities of model-less control (MLC) techniques (such as PID controllers) presents certain challenges to be overcome. The embodiments described herein present enabling solutions for overcoming such challenges. One such challenge is the relative lack of computational capability typically available for placing the MBC and MLC control solutions on the same hardware platform. One solution is to use parametric hybrid models for the MBC module (i.e., the MPC controller) to ensure computational efficiency of the online calculations. Such parametric hybrid models are described in greater detail in U.S. Pat. No. 8,019,701, U.S. Pat. No. 8,032,235, U.S. Patent Application Publication No. 2005/0187643, U.S. Patent Application Publication No. 2008/0208778, U.S. Patent Application Publication No. 2011/0106277, U.S. Patent Application Publication No. 2011/0295585, and U.S. Patent Application Publication No. 2012/0003623, each of which is incorporated herein by reference in its entirety for all purposes. Parametric hybrid models significantly improve the robustness of the model-based control in that the parametric hybrid models themselves have robust computational properties.

Another challenge is that industrial control operators that are used to dealing with MLC solutions, such as PID controllers, generally view MBC solutions as being overly complex and difficult to build and maintain models for. In particular, MLC applications (PID controllers, in particular) are accessed and used by a broad range of users that may have limited understanding of process modeling. Introducing models into the control scheme for such MLC controllers may be perceived to significantly exceed the capabilities of the end users. The parametric hybrid models facilitate model building, commissioning, and maintenance. For example, the parametric hybrid models may be distributed as library elements with pre-defined parameters to represent process models. An example of such distribution of parametric hybrid model components is described in greater detail in U.S. Patent Application Publication No. 2012/0239164, U.S. Patent Application Publication No. 2012/0239169, and U.S. patent application Ser. No. 13/621,631, each of which is incorporated herein by reference in its entirety for all purposes.

Figure 5:
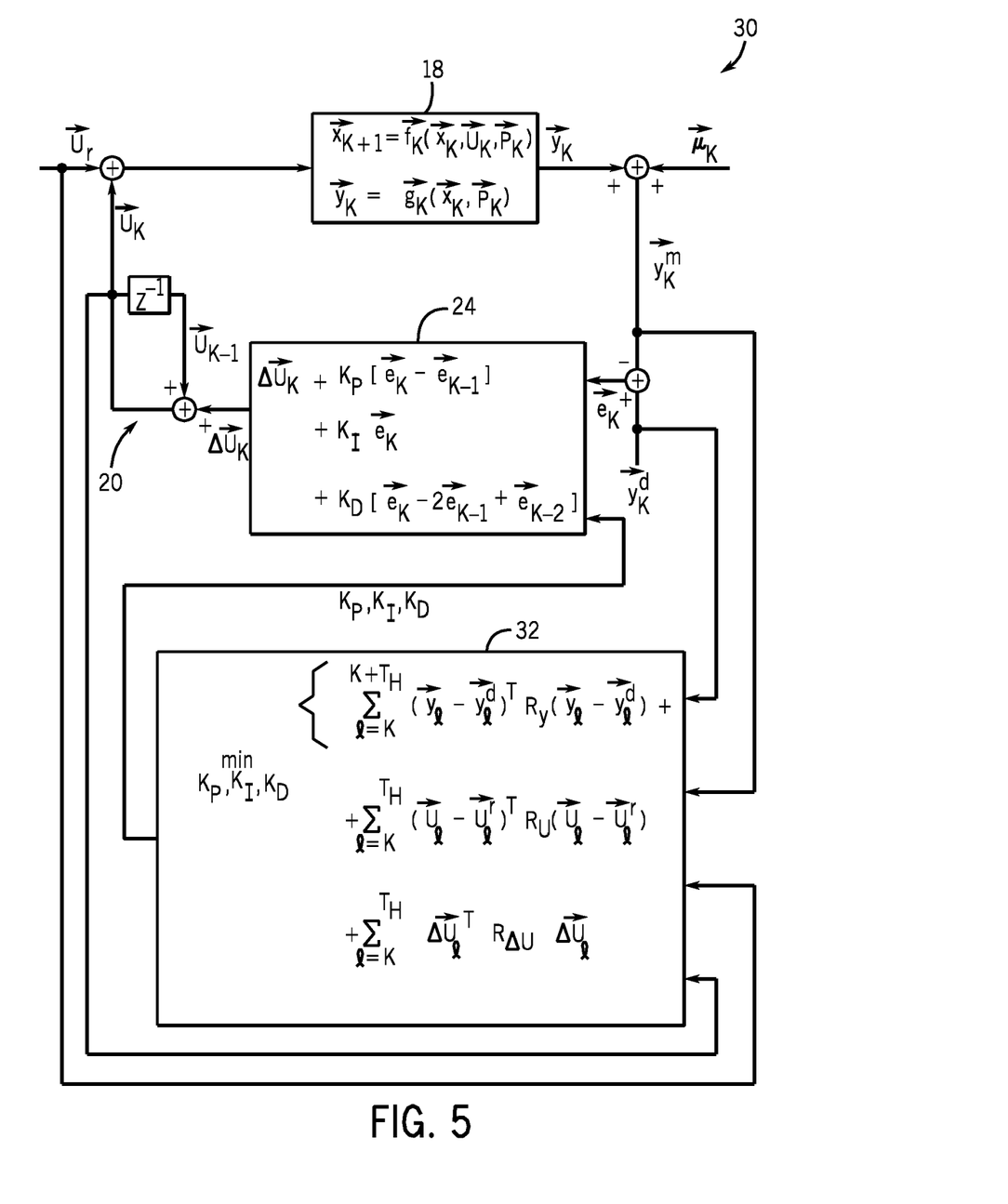
FIG. 5 is a schematic diagram of a control system in which an MPC controller is used to improve the performance of a PID controller, and where the PID coefficients of the PID controller are modified by the MPC controller during operation of the system being controlled.

FIG. 5 is a schematic diagram of a control system 30 in which a specifically formulated MPC controller 32 is used to improve the performance of a PID controller 24, and where the PID coefficients (e.g., $K_P$, $K_I$, and $K_D$) of the PID controller 24 are modified by the MPC controller 32 during operation of the system 18 being controlled. In the embodiment illustrated in FIG. 5, the MPC controller 32 uses the models of the system 18 being controlled to modify the PID coefficients (e.g., $K_P$, $K_I$, and $K_D$) of the PID controller 24 during operation of the system 18 being controlled. A distinction from conventional techniques is that the decision variables of the MPC block 32 include decision variables that are not direct inputs to the system 18 being controlled.

As illustrated in FIG. 5, the measured output $\vec{y}_k^m$ (the sum of the output vector $\vec{y}_k$ from the system 18 being controlled and the measurement noise vector $\vec{\mu}_k$) and the desired output $\vec{y}_k^d$, are delivered to the MPC controller (e.g., the model-based optimization module) 32 as inputs. In addition, the determined output vector $\vec{y}_k^d$ is compared to $\vec{y}_k^m$ to yield the output error vector $\vec{e}_k$, which is delivered to the PID controller 24. Furthermore, the parameter tuning module 32 also receives the control input vector $\vec{u}_k$ from the control loop 20 and the reference input vector $\vec{u}_r$ as inputs. Based on these inputs, the parameter tuning module 32 determines how the PID coefficients (e.g., $K_P$, $K_I$, and $K_D$) of the PID controller 24 should be modified over a prediction horizon based on a minimization of the following equation:

$$\sum_{l=k}^{k+T_H} (\vec{y}_l - \vec{y}_l^d)^T R_y (\vec{y}_l - \vec{y}_l^d) + \qquad (5)$$

$$\sum_{l=k}^{T_H} (\vec{u}_l - \vec{u}_l^r)^T R_u (\vec{u}_l - \vec{u}_l^r) + \sum_{l=k}^{T_H} \Delta \vec{u}_l^T R_{\Delta u} \Delta \vec{u}_l$$

subject to the constraints of:

$$\vec{y}_l = \vec{g}_l(\vec{x}_l, \vec{p}_l) \qquad (6)$$

$$\vec{u}_l = \vec{u}_{l-1} + K_P[\vec{e}_l - \vec{e}_{l-1}] + K_I \vec{e}_l + K_D[\vec{e}_l - 2\vec{e}_{l-1} + \vec{e}_{l-2}] \qquad (7)$$

$$\vec{x}_l = \vec{f}_{l-1}(\vec{x}_{l-1}, \vec{u}_{l-1}, \vec{p}_{l-1}) \qquad (8)$$

$$K_P \in [K_P^{max}, K_P^{min}] \qquad (9)$$

$$K_I \in [K_I^{max}, K_I^{min}] \qquad (10)$$

$$K_D \in [K_D^{max}, K_D^{min}] \qquad (11)$$

From an algorithmic perspective, the embodiments described herein achieve the objective of integrating model-based optimization and model-less control by parameterizing the model-less controller (i.e., the PID controller 24) and allowing the model-based controller (e.g., the MPC controller 32) to determine the optimal profile for these parameters. For PID controllers, such as the PID controller 24, the parameters could be proportional, integral, and derivative coefficients. For fuzzy logic controllers, the parameters could include the parameters that determine the shape of fuzzy membership functions (such as mean values). In addition, in certain embodiments, the model-based optimization module 32 may be defined such that the parameters of the model-less controller (e.g., the PID controller 24) are outputs of the model-based optimization module 32 in addition to some inputs to the system 18 being controlled.

In addition, the embodiments described herein define an objective function for the MPC controller 32 such that the performance of the plant or process (e.g., of the system 18 being controlled) conforms to some desired performance profile. For example, an objective function may be defined to minimize the deviation of the system output from a given set-point. In addition, the embodiments described herein define the constraint set for the decision variables such that the stability of the closed loop system can be ensured via a feasible solution.

In addition, the embodiments described herein define the constraint set such that the stability of the system 18 being controlled is ensured despite changes in parameter values. The constraint set can include the maximum/minimum allowable change in the model-less controller parameters (i.e., the PID coefficients $K_P$, $K_I$, and $K_D$) at each execution cycle. The constraint set can also include a maximum/minimum allowable change for the control signal to the system 18 being controlled (i.e., manipulated variables). In addition, the embodiments described herein use a solver to produce the decision variables that include appropriate model-less controller parameters profiles that enable control of the system 18. In addition to the model-less control system parameters, the decision variables may include manipulated variables not controlled by the model-less controllers. The decision variables may also include variables that combine with the output of a model-less controller.

In addition, the embodiments described herein obtain feedback from the system 18 being controlled. For example, process measurements from the system 18 being controlled can be used to modify the process model of the model-based controller 32. In addition, process measurements can be used to initialize the solver. In addition, in certain embodiments, performance metrics may be produced based on pre-defined performance criteria. The performance metrics can be used to modify the objective function programmatically. The performance metric can also be used to modify controller structure (e.g., impose decoupling to simplify the optimization process).

As such, the embodiments described herein include a methodology and algorithms for using the predictive capability of process models (e.g., the system 18 being controlled) to improve the performance of a model-less control system (e.g., the PID controller 24). In the case where the model-less controller is a PID controller 24, the embodiments described herein generate an optimal profile of the proportional, integral, and derivative coefficient matrices (e.g., $K_P$, $K_I$, and $K_D$) over a relevant prediction horizon. The proportional, integral, and derivative coefficient matrices are treated as decision variables in an explicit optimization that is executed online (i.e., during operation of the system 18 being controlled).

In the illustrated embodiment, the coupling between PID loops is handled explicitly via the online optimization. In other words, the control system 30 is communicatively coupled to the system 18 such that the PID coefficients $K_P$, $K_I$, and $K_D$ are continuously updated during operation of the system 18 being controlled. In particular, the PID coefficients $K_P$, $K_I$, and $K_D$ are updated with each successive cycle of execution. For example, in certain embodiments, the PID coefficients $K_P$, $K_I$, and $K_D$ are updated approximately every second, or even more frequently, depending on the processing power of the MPC and PID controllers 32, 24. The issue of the coupling between PID loops is handled explicitly via the online optimization. The PID controllers 24 described herein encompass adaptive PID controllers as a degenerate case (e.g. if the prediction horizon is limited to one). In contrast, conventional PID controllers only consider the current state of the error/controller performance (i.e., a prediction horizon of length 1).

Figure 6:
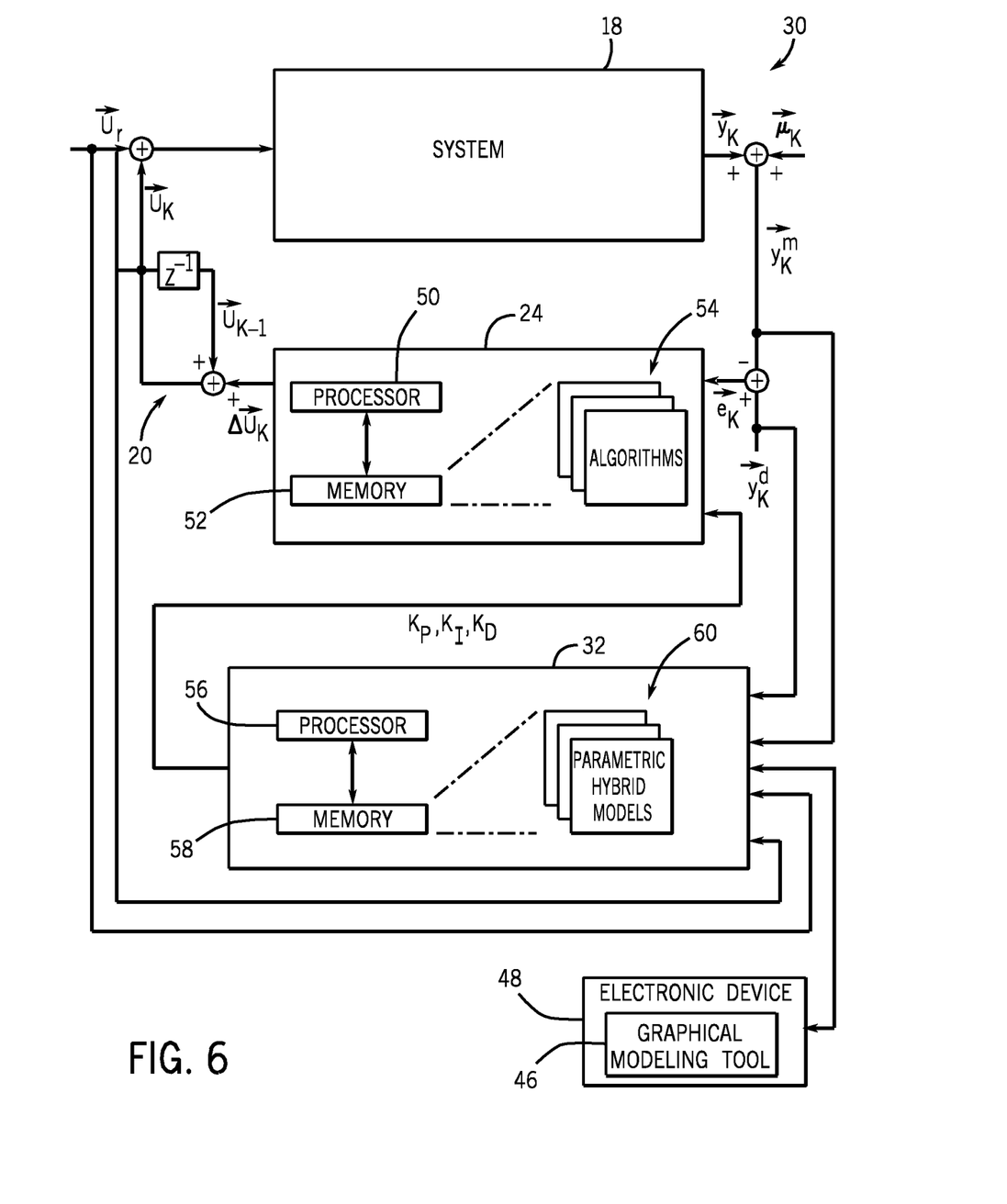
FIG. 6 is a schematic diagram of the control system of FIG. 5, illustrating exemplary components of the MPC controller, the PID controller, and a parameter tuning module.

FIG. 6 is a schematic diagram of the control system 30 of FIG. 5, illustrating exemplary components of the system 18 under control, the PID controller 24, and the model-based parameter tuning module 32. As described above, although illustrated as a separate component of the control system 30, in certain embodiments, the parameter tuning module 32 and the PID block 24 may be integrated into a single processor with sufficient computational capacity. As illustrated in FIG. 6, a model for the system 18 under control can be stored in a non-transitory machine-readable memory device 58 that is accessible by a processor 56. Parametric hybrid models 60 may be stored in the memory device 58, and are described in greater detail in U.S. Pat. No. 8,019,701, U.S. Pat. No. 8,032,235, U.S. Patent Application Publication No. 2005/0187643, U.S. Patent Application Publication No. 2008/0208778, U.S. Patent Application Publication No. 2011/0106277, U.S. Patent Application Publication No. 2011/0295585, and U.S. Patent Application Publication No. 2012/0003623, each of which is incorporated herein by reference in its entirety for all purposes. In certain embodiments, the MPC controller 32 may run on a server personal computer (PC).

Figure 7:
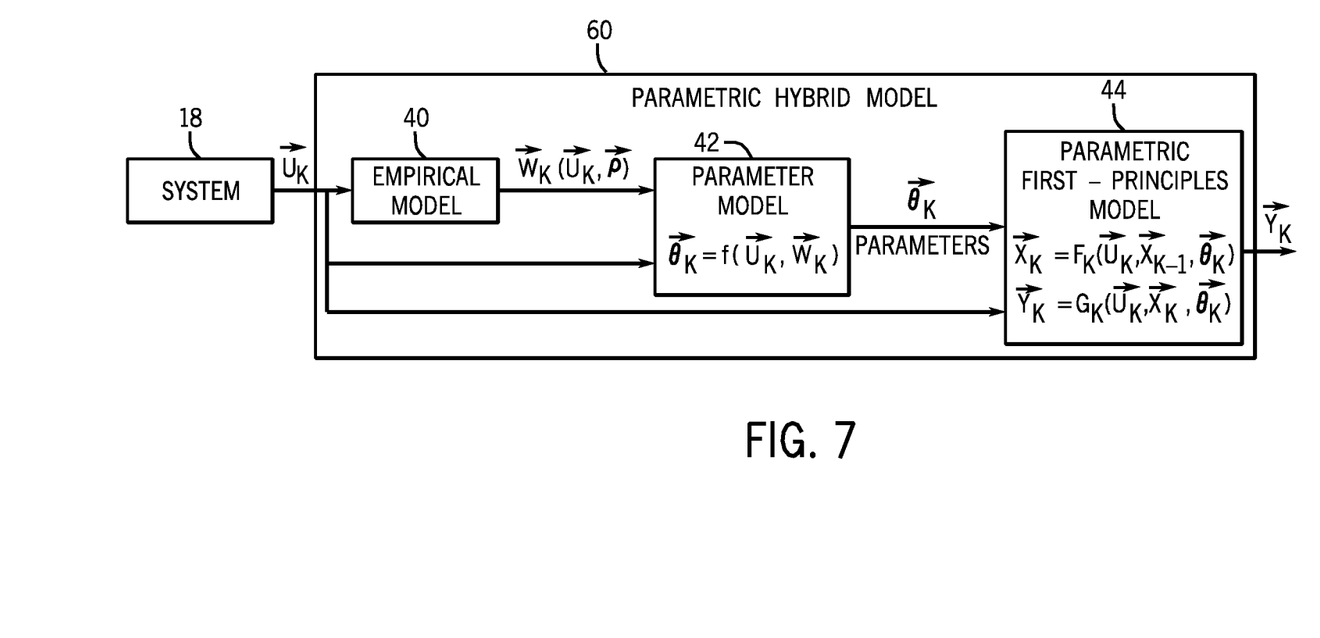
FIG. 7 is a schematic diagram of an exemplary parametric hybrid model that may be used in the MPC controller.

FIG. 7 is a schematic diagram of an exemplary parametric hybrid model 60 that may be utilized by the MPC controller (i.e., model-based optimization module that determines model-less controller parameters) 32. As illustrated, the variable inputs it $\vec{u}_k$ from the system 18 being controlled may be received by the parametric hybrid model 60. An empirical model 40 may use the variable inputs $\vec{u}_k$ to generate empirical model outputs $\vec{w}_k$. The empirical model outputs $\vec{w}_k$ may be a function of the variable inputs $\vec{u}_k$ and empirical model parameters $\vec{\rho}$. Both the empirical model outputs $\vec{w}_k$ and the variable inputs $\vec{u}_k$ may be directed into a parameter model 42 of the parametric hybrid model 60. Fundamental model parameters $\vec{\theta}_k$ from the parameter model 42 may be a function of the variable inputs $\vec{u}_k$ and the empirical model outputs $\vec{w}_k$. In certain embodiments, the fundamental model parameters $\vec{\theta}_k$ may include the empirical model outputs $\vec{w}_k$, or may simply be identical to the empirical model outputs $\vec{w}_k$ in their simplest form. The fundamental model parameters $\vec{\theta}_k$ may be directed into a parametric first-principles model 44, which may be either a steady-state or dynamic model. In addition, the parametric first-principles model 44 may receive the variable inputs $\vec{u}_k$ from the system 18 being controlled. The parametric first-principles model 44 may model measured or unmeasured state variables $\vec{x}_k$ and the variable outputs $\vec{y}_k$. The state variables $\vec{x}_k$ may be a function of the variable inputs $\vec{u}_k$, previous state variables $\vec{x}_{k-1}$, and the fundamental model parameters $\vec{\theta}_k$. The variable outputs $\vec{y}_1$, may be a function of the variable inputs $\vec{u}_k$, current state variables $\vec{x}_k$ and the fundamental model parameters $\vec{\theta}_k$. The variable outputs $\vec{y}_k$ may be directed from the parametric hybrid model 60 as outputs. Therefore, the general equations defining the parametric hybrid model 60 include:

$$\vec{w}_k = f_1(\vec{u}_k, \vec{\rho}) \quad (12)$$

$$\vec{\theta}_k = f_2(\vec{u}_k, \vec{w}_k) \quad (13)$$

$$\vec{x}_k = F_k(\vec{u}_k, \vec{x}_{k-1}, \vec{\theta}_k) \quad (14)$$

$$\vec{y}_k = G_k(\vec{u}_k, \vec{x}_k, \vec{\theta}_k) \quad (15)$$

where $\vec{u}_k$ is a vector of variable inputs over time k, $\vec{\rho}$ is a vector of empirical model parameters, $\vec{w}_k$ is a vector of empirical model outputs over time k, $\vec{\theta}_k$ is a vector of fundamental model parameters over time k, $\vec{x}_k$ is a vector of measured or unmeasured state variables over time k, and $\vec{y}_k$ is a vector of variable outputs over time k.

The parametric hybrid model 60 is extremely efficient for real-time optimization and control computations. This computational efficiency is critical to the successful implementation of a model-based control strategy that optimizes the performance of the system 18 being controlled. Dynamic optimization methods are used to calculate optimal dynamic trajectories during operation of the system 18 to optimize the efficiency of the system 18 as a whole. In particular, trajectories may be calculated for individual components of the system 18 and be optimized to a target over time based on parameters that are closely related to, but are not the same as, the input and output variables of the system 18. More specifically, as illustrated in FIG. 7, the fundamental model parameters $\vec{\theta}_k$ generated by the parameter model 42 may be a set of parameters that are not directly analogous to either the variable inputs $\vec{u}_k$ or the variable outputs $\vec{y}_k$. Rather, certain derived measures (e.g., the parameters) of the system 18 over the course of operation of the system 18 may be used to generate trajectories that strongly correlate to performance variables for the system 18, even when the performance variables for the system 18 are not directly measurable.

For example, as described in greater detail below, a particular variable of the system 18 may not be measured during operation of the system 18, and may be used as a parameter that correlates to, but is not that same as, the variable inputs and outputs $\vec{u}_k$, $\vec{y}_k$. Therefore, this parameter may be calculated during operation of the system 18 with the parametric hybrid models 60, and may be used in calculating an optimal trajectory for the particular variable. This allows better real-time control during operation of the system 18, such that intermediate performance of the system 18 may be more closely targeted and maintained. In certain embodiments, an optimal trajectory function may be determined by solving:

$$\min(u_k) \Gamma(\hat{y}_k, \bar{y}_k^{Trajectory}) \quad (16)$$

subject to:

$$\vec{w}_k = f_k(\vec{u}_k, \vec{\rho}) \quad (17)$$

$$\vec{\theta}_k = f(\vec{u}_k, \vec{w}_k) \quad (18)$$

$$\vec{x}_k = F_k(\vec{u}_k, \vec{x}_{k-1}, \vec{\theta}_k) \quad (19)$$

$$\vec{y}_k = G_k(\vec{u}_k, \vec{x}_k, \vec{\theta}_k) \quad (20)$$

$$L < u_k < H \quad (21)$$

where $\Gamma(\ )$ is the objective function defined over variable outputs, $\bar{y}_k$ is the variable outputs ($\bar{y}_k \in \vec{y}_k$), and $\bar{y}_k^{Trajectory}$ is an explicit or implicit representation of a desired variable trajectory. In addition, constraints (e.g., L and H above) may be trajectory functions. The minimization of the above objective function is achieved through adjustments to the decision variables $\vec{u}_k$ (e.g., the variable inputs). Note that the optimization problem above is merely exemplary and not intended to be limiting. For example, the objective function $\Gamma(\ )$ may be defined to include penalties on decision variables $\vec{u}_k$.

The dynamic optimization described above may be implemented using various methods. The level of detail included in the parametric hybrid models 60 may vary depending upon the level of complexity that may be handled in real time. In other words, the parametric hybrid modeling allows a systematic way of compromising between model accuracy and computational complexity and, therefore, offers flexibility to handle systems 18 of varying levels of complexity. More specifically, the complexity of any given parametric hybrid model 60 is a function of both the complexity of the system 18 being modeled, and the simplicity of the parametric hybrid model 60 needed to make real-time computations tractable. As such, the parametric hybrid model framework offers a systematic framework for optimally trading off model accuracy versus computational efficiency. In defining parametric hybrid models 60, in certain embodiments, short-cut models may be used (e.g., in the parametric first-principles models 44). These short-cut models may be linear or nonlinear, dynamic or steady-state, and so forth. The parametric hybrid model framework remains current with the real-time operating conditions of the system 18, and allows for online modification of the model parameters, which are not direct inputs or outputs of the system 18, and hence the decision engine (i.e., the optimization and control) always has valid models upon which to base decisions.

The parametric hybrid model 60 models both steady-state and the non-steady-state behavior of the processes of the system 18, whether the behavior is linear or nonlinear, with respect to critical variables, where gains and/or dynamics vary during operation of the system 18. The optimal control system includes: (1) parametric hybrid models 60 of the components of the system 18, (2) parametric hybrid models 60 of how these components are connected together to define the system 18, (3) a description of what the performance objectives are, and (4) a description of what the constraints are. Some of the variables (e.g., the parameters described herein) that are indicative of performance of the system 18 (or individual components of the system 18) may not be measured or even easily measurable. The parametric hybrid models 60 are used to model these variables (e.g., the parameters described herein) as well. Then, an optimizer may make decisions as to which inputs to the system 18 should be given system models/objectives/constraints. As such, the parametric hybrid model framework allows all of the models to remain current, while solving the optimization problem (i.e., making decisions) as quickly as possible. Achieving these two goals enables the optimal management system described herein to continuously make the best decisions based on what is actually happening with the system 18 in substantially real-time.

Returning now to FIG. 6, as also described above, the parametric hybrid models 60 that are used by the MPC controller 32 may be configured using a graphical modeling tool 46, such as the graphical modeling tools described in greater detail in U.S. Patent Application Publication No. 2012/0239164, U.S. Patent Application Publication No. 2012/

0239169, and U.S. patent application Ser. No. 13/621,631, each of which is incorporated herein by reference in its entirety for all purposes. The graphical modeling tool 46 may be a program that is executed by the processor 56 of the MPC controller 32, a program (as illustrated in FIG. 6) that is executed on an electronic device 48 that communicates with the MPC controller 32 (e.g., either through wired or wireless communications), or some combination thereof. In general, the graphical modeling tool 46 presents a relatively simplified architecture for manipulating and monitoring the parametric hybrid models 60 that are utilized by the MPC controller 32.

As also illustrated in FIG. 6, the PID controller 24 may also include a processor 50 configured to execute program instructions that are stored on a non-transitory machine-readable memory device 42. For example, the memory device 52 may store the PID coefficients $K_P$, $K_I$, and $K_D$ of the PID controller 24, as well as algorithms 54 for operating the PID controller 24, which generally remain unchanged during operation of the PID controller 24. Moreover, upon receiving command signals from the parameter tuning module 32, the PID coefficients $K_P$, $K_I$, and $K_D$ stored in the memory device 52 may be updated. In certain embodiments, the PID controller 24 may run on hardware powered by a distributed control system (DCS) or programmable logic controller (PLC) system, such as Logix.

The memory device 58 may include the algorithms for determining how the PID coefficients $K_P$, $K_I$, and $K_D$ of the PID controller 24 should be updated. However, again, as described above, in certain embodiments, the parameter tuning module 32 may be integrated into a single processor along with the PID controller 24 such that the memory device 58 of the parameter tuning model 32 is actually the memory device 52 of the PID controller 24 and the processor 56 of the parameter tuning model 32 is actually the processor 50 of the PID controller 24. In other words, in certain embodiments, the program instructions (e.g., algorithms) for determining how to update the PID coefficients $K_P$, $K_I$, and $K_D$ of the PID controller 24 are stored in the memory device 52 shared by the PID controller 24 and executed by the processor 50 shared by the PID controller 24 (i.e., in substantially real-time (e.g., re-executed approximately every second, or even more frequently)).

As described above, the embodiments described herein facilitate model-based optimization of model-less control. In particular, in certain embodiments, the MPC controller 32 utilizes parametric hybrid models 60 to represent the process model for model-based optimization. For example, the PUNDA modeling techniques described in U.S. Pat. No. 8,019,701 provide an exemplary computationally efficient means for accurately approximating a complex dynamic process, such as the system 18 being controlled by the PID controller 24. In addition, the embodiments described herein facilitate online modification (e.g., in substantially real-time) of the system model parameters, including the PID coefficients $K_P$, $K_I$, and $K_D$ of the PID controller 24.

Furthermore, a computationally efficient solver may be used by the MPC controller 32 to operate the parametric hybrid models 60 and, in certain embodiments, determine how to re-adjust the PID coefficients $K_P$, $K_I$, and $K_D$ of the PID controller 24, with deterministic frequency to solve the optimization problem in the MPC controller 32. An exemplary solver may include an initialization strategy that respects optimization constraints, is feasible for online optimization, is capable of online modification of optimization constraints and objectives, and may include a hot-start with the capability of over-writing a starting solution.

Figure 8:
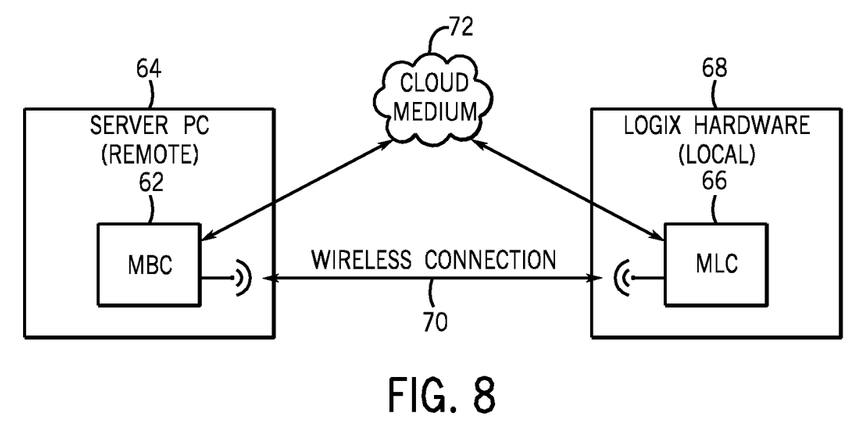
FIG. 8 is a schematic diagram of a model-based controller and a model-less controller configured to communicate with each other.

As described above, the MPC controller 32 may be referred to as a model-based controller (MBC) insofar as the MPC controller 32 includes models of the system 18 being controlled, whereas the PID controller 24 may be referred to as a model-less controller (MLC) insofar as the PID controller 24 does not include models of the system 18 being controlled. As described herein, the MPC controller 32 and the PID controller 24 are generally described as being separate components. For example, in certain embodiments, as illustrated in FIG. 8, an MBC 62 (e.g., the MPC controller 32) may run on a server personal computer (PC) 64 and an MLC 66 (e.g., the PID controller 24) may run on hardware powered by Logix 68. As such, the MBC 62 may be remotely deployed and configured to connect to the local controller (e.g., ControlLogix) running the MLC 66. In such embodiments where the MBC 62 and the MLC 66 are on separate hardware components, the MBC 62 and the MLC 66 may communicate data securely and wirelessly between each other via a secure wireless communication link 70. Furthermore, in certain embodiments, the MBC 62 and the MLC 66 may communicate data between each other through the use of a cloud-based medium 72, which may serve as the medium for data exchange.

Figure 9:
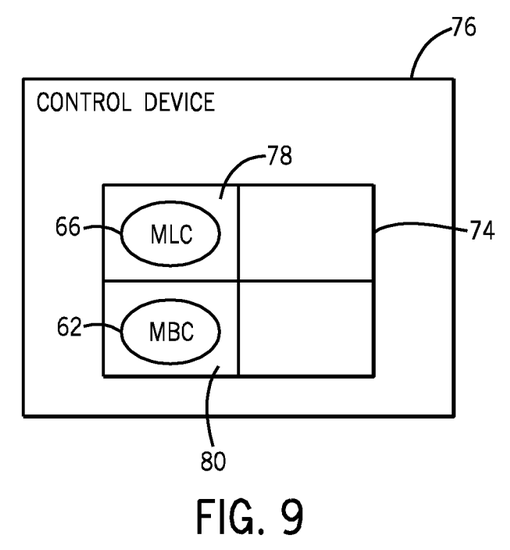
FIG. 9 is a schematic diagram of a control device having a multi-core processor configured to execute the model-based controller and the model-less controller in separate processing cores of the multi-core processor.

In addition, although described herein as being associated with separate components (e.g., having separate processors and memories), in certain embodiments, the MBC 62 and the MLC 66 may actually be executed on a multi-core processor 74 of a single control device 76, as illustrated in FIG. 9. In such an embodiment, the MLC 66 may run on a main processing core 78 of the multi-core processor 74, and the MBC 62 may run on an auxiliary processing core 80 of the multi-core processor 74, or vice versa.

Figure 10:
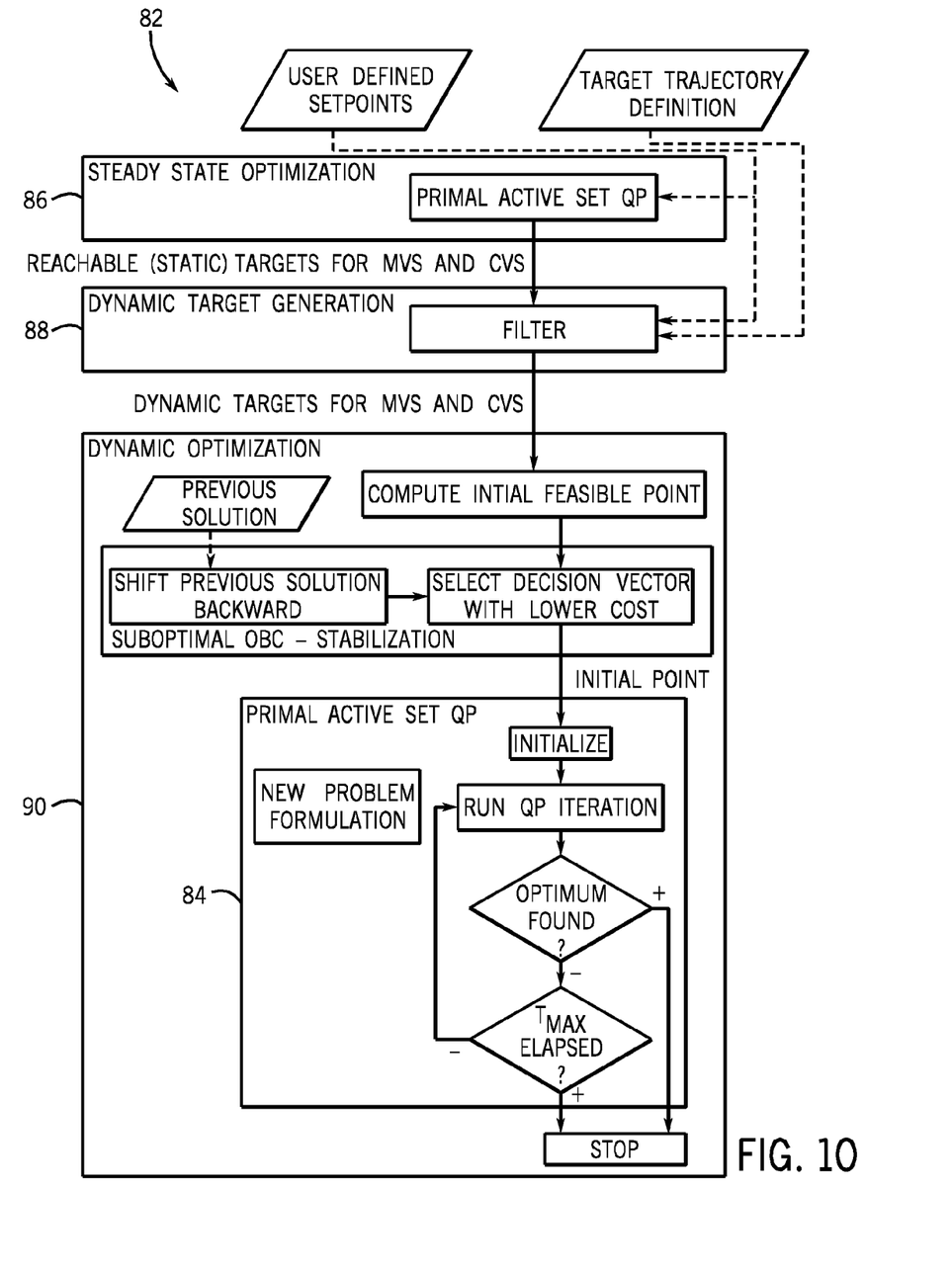
FIG. 10 is a flow diagram of exemplary algorithms for a computationally efficient solver for use with the embodiments described herein.

As described above, the embodiments described herein may utilize a computationally efficient solver. FIG. 10 is a flow diagram 82 of exemplary algorithms for such a solver. Existing general OBC (optimization-based control) formulations may include many features that lead to QP (quadratic programming) problems with an excessive number of decision variables and complex, ill-conditioned constraints. In order to have the QP problem size relatively small, the complex features may be reduced and simplified while keeping all necessary features essential for the majority of applications. These features include hard and rate-of-change constraints for manipulated variables (MVs). OBC controllers very often provide useful zone control features designed to keep controlled variable (CV) within specified limits instead of forcing it to reach a constant setpoint. To accommodate this feature in a computationally efficient manner, this algorithm incorporates a modification to the cost function in which, at each computation step, an optimal constant target within the limits is determined as a part of dynamic optimization. This formulation adds just one decision variable with simple bounds to the QP problem. Similar to some existing QP solvers, the QP solver of FIG. 10 can very efficiently handle simple bound constraints compared to complex (general) constraints. To take advantage of this property, relative variations of inputs (MVs) may be used as decision variables, and simple bounds may be defined as a funnel that reflects both hard and rate-of-change (ROC) constraints. The simple bounds are favored over ROC constraints, especially in the worst case when all ROC constraints are active. The resulting QP constraints include just simple bounds and ROC constraints whose structure is exploited by the QP solver.

A feature of the QP method is that the constraints most often appear as simple bounds rather than more complex ROC constraints, which results in substantial savings in computational work. Tests also show that fewer iterations of QP are required to converge as compared with conventional formulations. Moreover, Hessian matrix of the QP problem is generally better conditioned as compared to conventional formulations.

The algorithms depicted in FIG. 10 enable an efficient, feasible QP solver in the form of primal-active set algorithms. Exploiting the imposed structure on the optimization problem leads to enhanced numerical stability and computational speed of the search process. In particular, the algorithms include efficient initialization of reduced Hessian matrix to enhance search speed. Modified Choleski factorization may be used for this initialization. In addition, the algorithms include effective computation of initial point and active set. In particular, a self-scaled version of fast Givens rotations may be used to eliminate square root operations and significantly reduce computational work compared with conventional Givens rotations, while preserving numerical stability. Furthermore, an efficient formula for plane Givens rotations may be derived when adding constraints to the active set. In addition, the algorithms resolve degeneracy. Furthermore, the algorithms fully exploit the problem structure when adding constraints, computing step size, computing dual variables, updating gradients and refining iterations, and so forth.

It may not be possible to guarantee that the QP algorithms will converge to optimum solutions in a user predefined time or equivalently in a predefined number of floating point operations. However, in practice, it may be sufficient for real-time OBC to get a feasible, sufficiently acceptable suboptimal solution. In certain situations, the primal active set solver (e.g., block 84) may be prematurely interrupted when the allowed maximum time elapses to provide a feasible suboptimal solution. One sufficient condition is to guarantee that the cost function doesn't grow between consecutive computation steps. For example, an acceptable and feasible initial point (e.g. clipped unconstrained solution of the QP problem) may first be calculated. Then, a shifted trajectory of MVs received from previous optimization steps may be calculated. Finally, an initial point with lower cost may be chosen. In this manner, the suboptimal control remains stabilizing at least in a nominal case.

The OBC dynamic optimization is a part of the whole OBC algorithm that is divided into three optionally configurable modules. These modules include: (1) steady state optimization (SSO) 86, (2) dynamic target generation 88, and (3) dynamic optimization 90. The SSO 86 can have two different goal. The first goal of the SSO 86 is to find the most profitable SS operating point (target) based on defined economic objective function and constraints. This process is called economic optimization (EO). The second goal of the SSO 86 is to find reachable (i.e., feasible) SS targets that are as close to unreachable setpoints as possible. The targets are calculated for both MVs and CVs. In certain embodiments, the SSO 86 may be in the form of QP with simple bounds so that the QP solver may be used even for this task. The SSO 86 includes much fewer decision variables than dynamic optimization and, hence, is much faster.

Application of unreachable setpoints in OBC dynamic optimization may result in procrastination (e.g., the controller predicts future actions that are never applied, and are delayed at each computation step). In contrast, when the unreachable setpoints are replaced with optimal reachable targets computed in the SSO 86, there is no procrastination; however, the closed loop system is somewhat less robust with respect to modeling error and measured/unmeasured disturbances. This results from the fact that the reachable targets are computed based on a steady state model and the assumption of constant future disturbances. This may increase dependence on both model accuracy and future disturbance prediction accuracy.

The dynamic target generation module 88 may be configured such that it generates target trajectories based on both unreachable setpoints and reachable targets such that effects of procrastination are reduced and robustness is satisfactory.

Potential application scenarios for the embodiments described herein include, but are not limited to, the following: (1) High-performance PID controllers 24: The control system 30 illustrated in FIGS. 5 and 6 enables a high-performing PID controller 24, especially when multiple PID loops with coupled dynamics are involved; (2) Application of MPC in fast processes: Many control applications in the process industry, such as temperature and pressure controls, have dynamic responses that are too fast for conventional MPC controllers, whereas the embodiments described herein enable the use of MPC technology in such speed-critical applications; and (3) Integrated optimization and control for distributed large-scale systems: True plant-wide optimization generally requires communication of relevant constraints, objectives, planned control actions, pricing, and so forth, among physically distributed control systems. The presence of an MPC controller 32 as a part of a regulatory control system will significantly facilitate the deployment of true plant-wide optimization.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A control system, comprising:
   a model-less controller configured to control operation of a plant or process by determining a variable input to the plant or process using parameters of the model-less controller, wherein the model-less controller comprises a proportional-integral-derivative (PID) controller and the parameters of the model-less controller comprise a proportional matrix coefficient, an integral matrix coefficient, and a derivative matrix coefficient; and
   an automation controller operatively configured to:
   access a model of the plant or process; and
   determine a dynamic trajectory of each of the parameters of the model-less controller over a prediction horizon via an explicit optimization procedure in the automation controller based at least in part on the model of the plant or process.

2. The control system of claim 1, wherein the automation controller is configured to determine the dynamic trajectory of the parameters using the explicit optimization procedure subject to constraints on the parameters to ensure feasibility of the parameters over the prediction horizon.

3. The control system of claim 2, wherein the automation controller is configured to determine the dynamic trajectory of the parameters in substantially real-time during operation of the plant or process, wherein the prediction horizon is greater than one time step.

4. The control system of claim 1, wherein the automation controller comprises a model predictive controller.

5. The control system of claim 1, wherein the model of the plant or process comprises a parametric hybrid model.

6. The control system of claim 5, comprising a graphical modeling tool configured to facilitate modification of the parametric hybrid model.

7. A computer-implemented method, comprising:
   receiving a variable input to a plant or process being controlled by a model-less controller, wherein the model-less controller comprises a proportional-integral-derivative (PID) controller and a parameter of the model-less controller comprise a proportional matrix coefficient, an integral matrix coefficient, or a derivative matrix coefficient;

determining a variable output from the plant or process using a model of the plant or process based at least in part on the variable input; and determining a dynamic trajectory of the parameter of the model-less controller over a prediction horizon via an explicit optimization procedure based at least in part on the variable input and the variable output, wherein the model-less controller is configured to control operation of the plant or process by determining the variable input based at least in part on the dynamic trajectory of the parameter over the prediction horizon.

8. The computer-implemented method of claim 7, wherein determining the dynamic trajectory of the parameter of the model-less controller comprises determining the dynamic trajectory of the parameter using the explicit optimization procedure subject to constraints on the parameter to ensure feasibility of the parameter over the prediction horizon.

9. The computer-implemented method of claim 7, wherein determining the dynamic trajectory of the parameter of the model-less controller comprises determining the dynamic trajectory of the parameter in substantially real-time during operation of the plant or process, wherein the prediction horizon is greater than one time step.

10. The computer-implemented method of claim 7, wherein the model of the plant or process comprises a parametric hybrid model.

11. A tangible, non-transitory, computer readable medium configured to store instructions executable by a processor, wherein the instructions comprise instructions to:

parameterize, using the processor, a model-less controller into a plurality of parameters, wherein the model-less controller is configured to determine a variable input to a plant or process, the model-less controller comprises a proportional-integral-derivative (PID) controller, and the plurality of parameters comprises a proportional matrix coefficient, an integral matrix coefficient, and a derivative matrix coefficient;

determine, using the processor, a dynamic trajectory of each of the plurality of parameters over a prediction horizon via an explicit optimization procedure based at least in part on a model of the plant or process; and control, using the processor, operation of the plant or process by determining the variable input to the plant or process based at least in part on the dynamic trajectory of each of the plurality of parameters.

12. The computer readable medium of claim 11, wherein the instructions to determine the dynamic trajectory of each of the plurality of parameters comprise instructions to determine the dynamic trajectory of each of the plurality of parameters via the explicit optimization procedure subject to constraints on one or more of the parameters to ensure feasibility of the parameters over the prediction horizon.

13. The computer readable medium of claim 11, wherein the instructions to determine the dynamic trajectory of each of the plurality of parameters comprise instructions to determine the dynamic trajectory of each of the plurality of parameters in substantially real-time during operation of the plant or process, wherein the prediction horizon is greater than one time step.

14. The computer readable medium of claim 11, wherein the model-less controller comprises a fuzzy logic controller and the plurality of parameters comprise a shape of a fuzzy membership function.

15. The computer readable medium of claim 11, wherein the model of the plant or process comprises a parametric hybrid model.

16. The computer readable medium of claim 15, comprising instructions to operate a graphical modeling tool configured to facilitates graphical modification of the parametric hybrid model.

* * * * *